Feb. 25, 1941.  E. ALTENKIRCH  2,233,189
SEPARATING AND COOLING APPARATUS
Filed Sept. 21, 1936   2 Sheets-Sheet 1
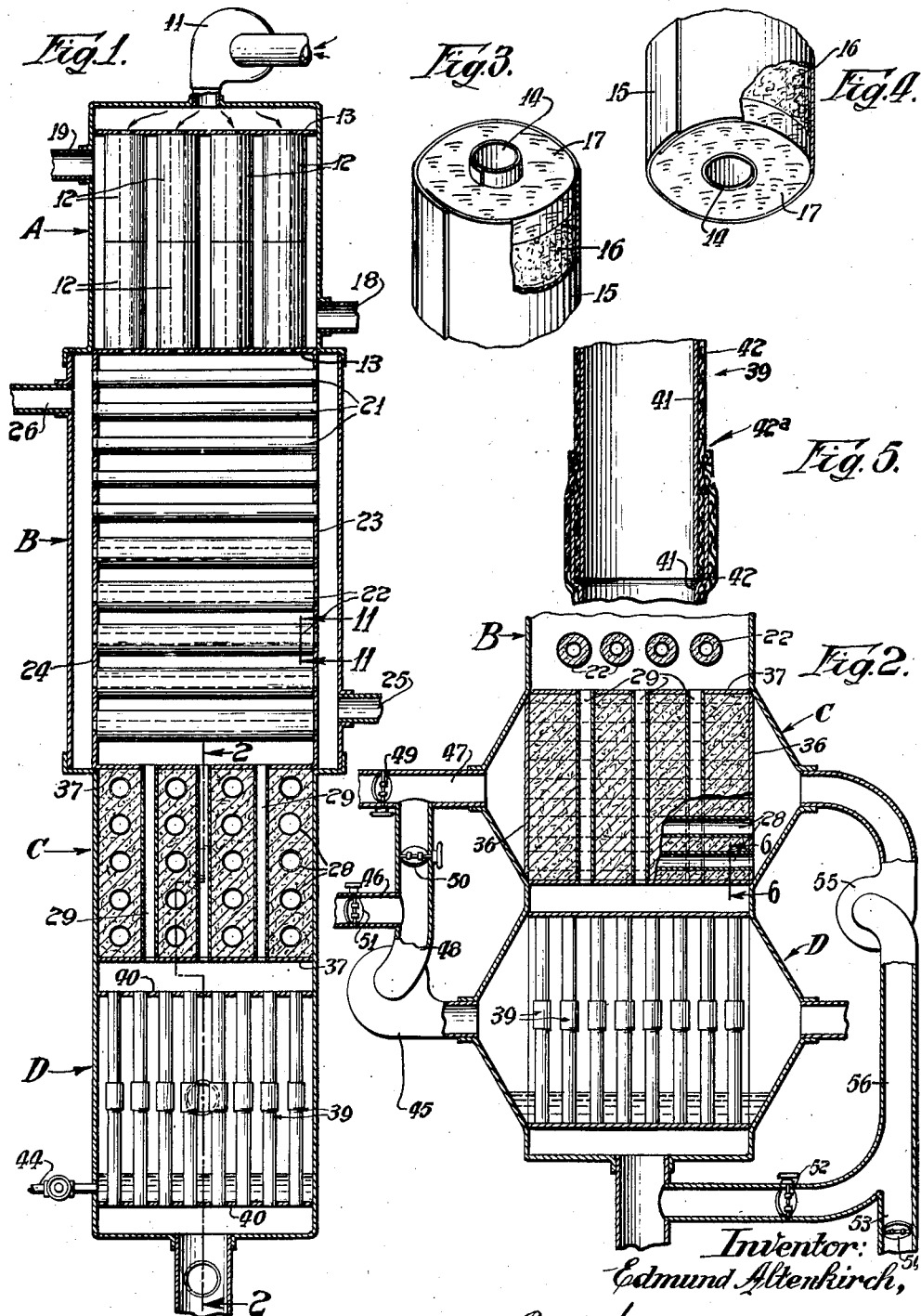
Inventor:
Edmund Altenkirch,
By: Harry S. Ducarss
Attorney.
Witness:
E. Camporini

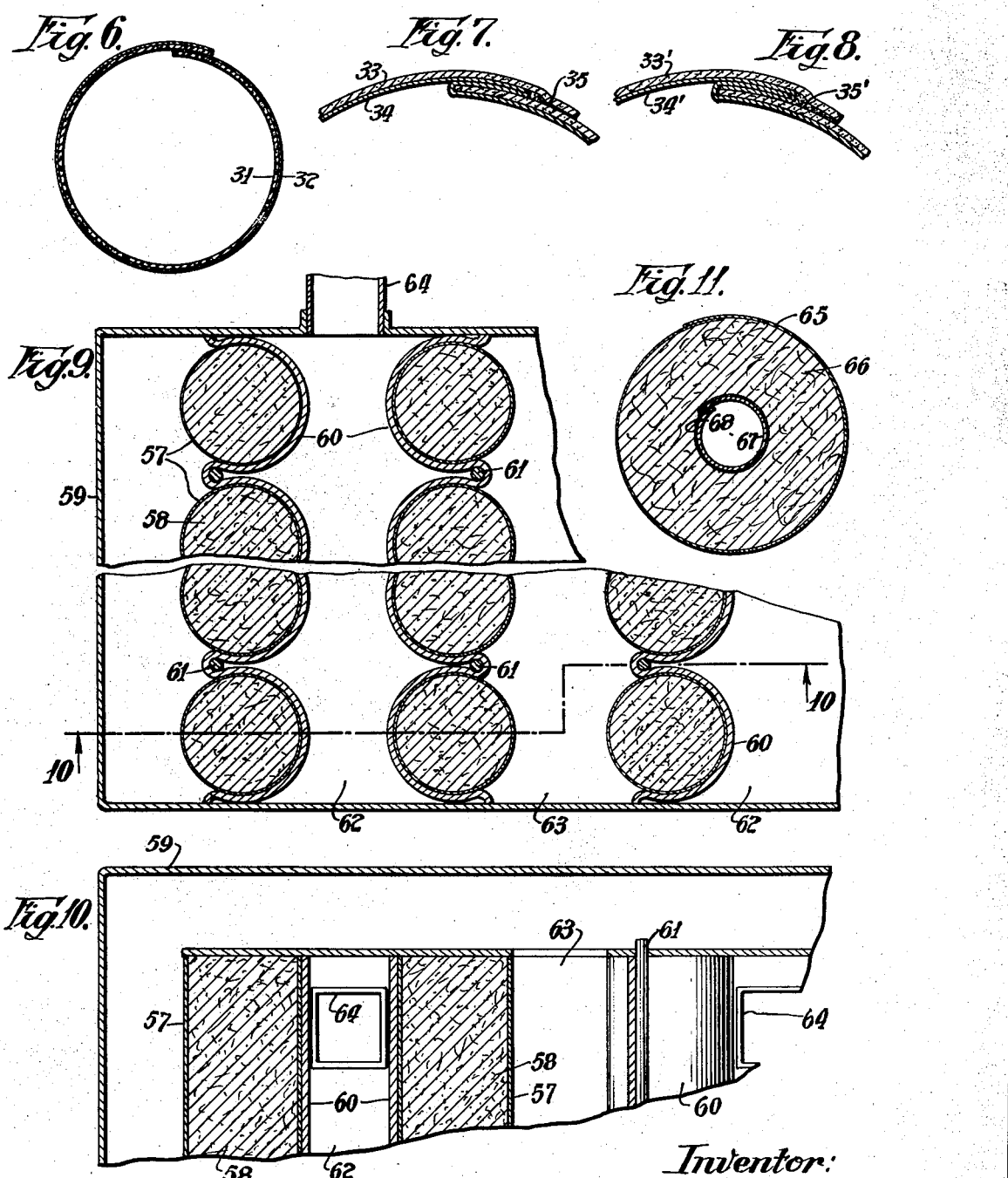

Patented Feb. 25, 1941

2,233,189

UNITED STATES PATENT OFFICE 2,233,189

SEPARATING AND COOLING APPARATUS

Edmund Altenkirch, Neuenhagen, near Berlin, Germany

Application September 21, 1936, Serial No. 101,875
In Germany October 2, 1935

9 Claims. (Cl. 62—139)

This invention relates to apparatus for separating gaseous mixtures by the process of absorption, and, if desired, the cooling of those gases not absorbed.

The object of the invention is the provision of simple and inexpensive means for separating gaseous mixtures by the process of absorption.

Still another object of the invention is to provide an apparatus which is simple in design and composed of readily available and inexpensive materials.

Another object of the invention is to provide a gas separator which may be easily reconditioned by the process of regeneration after an extended period of use during which the absorbent materials have become more or less saturated with the gas being absorbed.

Another object of the invention is the provision of novel inexpensive means for utilizing cheap but highly efficient absorbent materials not heretofore generally used because of the expensive apparatus required.

Another object of the invention is the provision of efficient means for dissipating the heat of absorption to a cooling medium such as atmospheric air without carrying away any of the absorbent material.

Another object of the invention is the provision of means for economically utilizing loose or granular absorption material which is usually characterized by a low co-efficient of heat conductivity without danger of contaminating the gas not absorbed thereby.

Other objects of the invention reside in certain novel features of the arrangement and construction of parts as will be apparent from the following description taken in connection with the accompanying drawings in which:

Figure 1 is a view in vertical section of an apparatus for carrying out the objects of this invention.

Figure 2 is a vertical sectional view on line 2—2 of Figure 1 and shows further details of the lower portion of the apparatus illustrated in Figure 1.

Figures 3 and 4 are fragmentary views of one form of the absorbing and heat exchange members.

Figure 5 is a vertical sectional view of the cooling tubes employed in the lower portion of the apparatus shown in Figure 1.

Figure 6 is a sectional view on line 6—6 of Figure 2 of one form of absorption and heat exchange tube used in another part of the apparatus.

Figures 7 and 8 are sectional views of modified forms of the tube shown in Figure 6.

Figure 9 is a sectional view of a modified form of absorber and heat exchanger.

Figure 10 is a sectional view on line 10—10 of Figure 9.

Figure 11 is a cross-sectional view on line 11—11, Figure 1, of certain of the gas separating and heat exchange tubes in section B.

While the apparatus is of general utility and application in the art of gas separation by the process of absorption, yet the present device is especially adapted for use in the field of air conditioning where it is necessary to treat large volumes of air to reduce the relative humidity and temperature at a minimum of expense and attention. According to this invention, these objects are served admirably, as will appear more fully hereinafter. As will be seen from Figure 1, the apparatus may be conveniently divided into four sections, A, B, C and D. In the upper section A are located a plurality of drying tubes 12 which extend between and are supported by upper and lower header plates 13, 13. These tubes are illustrated more fully in Figures 3 and 4 and may consist of one or more sections. Each section comprises an inner tube 14 of paste-board or other porous material which is readily permeable to water vapor and yet of sufficient strength to support the loose hygroscopic material 16 contained between tube 14 and the outer heat exchange tube 15. The outer tube may be of aluminum foil or other material of high heat conductivity. The hygroscopic material may be potash, soda, fuller's earth or other equivalent material and is held in place at the opposite ends of the tube sections by suitable retainer rings 17. In order that as many tube sections as desired may be conveniently connected together, tube 14 is preferably somewhat longer than tube 15 and adapted to telescope into one end of an adjacent tube 14.

Tubes 12 are so located in section A that a cooling medium such as atmospheric air may be conducted through the section by means of conduits 18 and 19 to carry away the heat of adsorption developed in the hygroscopic material. This construction also serves as a means for regenerating the hygroscopic material after its efficiency has been lowered by a prolonged period of use. Whenever it is desired to regenerate the section, heated gases are passed through the casing by means of conduits 18 and 19 to heat up the hygroscopic material and thus drive off the water contained therein.

The partially dried air next passes into section B which contains two sets of tubes 21 and 22. The tubes of the upper set 21 are intended to act primarily as cooling tubes to reduce the temperature of the air, and also as drying and gas separating tubes. Tubes 21 consist of an inner heat exchange tube of metal, and an outer thick covering of absorption paper. It will thus be appreciated that the heat exchange capacity of these tubes is quite large while the absorption capacity is small as compared with that of tubes 12.

The cooled and partially dried air next comes in contact with tubes 22 having a relatively high absorption capacity and a relatively low air cooling capacity as compared to tubes 21. A preferred mode of constructing these tubes is to surround an inner paper tube 67 having an outer coating of varnish 68 by papier-mâché 66 which is held in position by an outer paper tube 65. The outer paper tube must, of course, be porous so that the water vapor may readily pass through the same and be absorbed by the papier-mâché. The varnish coating serves to prevent the water from saturating the inner tube which conveys a cooling medium.

Tubes 21 and 22 are shown as arranged horizontally between header plates 23 and 24. Cooling air or gas can be conducted through section B and through tubes 21 and 22 by means of conduits 25 and 26, which can also be used for purposes of regenerating tubes 21 and 22 when this becomes necessary.

The air now passes into the third section C of the apparatus which contains a horizontal set of heat exchange tubes 28 supported between header plates 36, and a vertical set of porous paper tubes 29 supported between header plates 37. The space between the tubes is filled with hygroscopic material such as sawdust, silica gel, soda, or other similar material having an affinity for water vapor. The air to be dried passes downwardly through the vertical tubes, while the cooling medium flows through the horizontal tubes.

The fourth and last section D of the apparatus is a cooler which is preferably cooled by the evaporation of a liquid as water in heat exchange relation to the highly dried air received from section C. In this section are a plurality of vertically arranged tubes 39 carried by header plates 40 and constructed in the manner clearly shown in Figure 5. From this view it will be seen that tubes 39 comprise one or more sections which telescope into one another at their ends. Each section is made of an inner heat exchange tube 41 and an outer porous tube 42 of wicking or like material. The upper ends of tubes 42 may extend about the inner tube as shown at 42a in order to contact the wicking of the next tube to convey a liquid therebetween. The wicking should be maintained moist by some liquid as water in any desired manner. One way of insuring this is to convey the liquid into the bottom of section D by means of a conduit 44. The liquid level may, of course, be maintained constant by any well known automatically operating means.

A fan 45 (Figure 2) can be employed to supply air to the space around tubes 39 to facilitate the evaporation of water from the wicking. The air supply for fan 45 may be taken from the atmosphere through inlet 46 and conduit 48 or it may be derived from the exhaust of section C through conduits 47, 48. Likewise, the cooling air for section C may be derived from the atmosphere through intake 53 controlled by valve 54, or from the dried and cooled conditioned air of section D, through pipe 56 which in turn is controlled by valve 52. If fan 45 is not so connected to section C by a proper adjustment of valves 49, 50 and 51 as to draw air through the section, it is necessary to operate fan 55 in conduit 56.

From the foregoing it will be seen that provision is made for great flexibility of operation to meet changing conditions and different modes of use. If it is desired to obtain high efficiency in section D, part of the cool, dry air exhausted by the apparatus can be led back through section C to reduce the temperature of the absorption tubes and thereby increase the absorption capacity of this section. This same air may then be delivered to section D, where, due to its very low relative humidity, it is capable of holding a large quantity of moisture evaporating from the wicking on tubes 39, and thereby increase the cooling capacity of these tubes. On the other hand, many variations of the above may be had by varying the adjustment of the various valves so that part of the air passing through sections C and D is conditioned and part atmospheric, or all the air employed is atmospheric.

Figures 6, 7 and 8 show alternative forms of tubes which can be substituted for tubes 21 and 28. In Figure 6, the tube is formed by placing a sheet of foil 32 upon a sheet of porous paper 31 and fastening the opposite edges of the sheets together in any known manner to form a tube. Since the various tubes containing the hygroscopic material may expand differently in various portions of the apparatus, it is desirable to provide a resilient connection between at least one end of the tubes and the corresponding header plate. This connection may be made in any well known manner so as to permit differential expansion of the tubes, and to prevent buckling or warping of the tubes.

Figure 7 shows a reverse arrangement of the two sheets, the metal sheet 34 being inside the porous sheet 33, and the whole being joined to form a tube in the particular manner clearly illustrated. The tube is held together by glue 35 or other adhesive or fastening means. Figure 8 shows still another mode of forming the tubes, and many other equivalent modes of construction will suggest themselves to those interested without departing from the scope of this invention.

The operation of the invention so far described is thought obvious, but will be briefly summarized as follows: Air or other media to be conditioned is supplied to section A of the apparatus by means such as a fan 11. This air will be rich in water vapor. As the air passes down through tubes 12, a large amount of the water vapor will be absorbed by porous tubes 14 and hygroscopic material 16. Since heat is liberated in the process of absorption it is necessary to provide means to carry away this heat if the process is to be carried on efficiently. This is accomplished according to this invention by passing other air over tubes 12 to absorb the heat. It will be observed that tubes 12 have a relatively high absorptive capacity and a low heat exchange capacity. It is therefore desirable to cool the air somewhat before attempting to dry it further.

The air is accordingly cooled in the top of the next section B due to a more equitable design of the cooling and absorption capacities of tubes 21. After the air has been cooled, it is further dried by tubes 22 containing such hygroscopic material as papier-mâché.

In order to insure that the air is thoroughly dried, it is next passed into drying section C, and thereafter to section D where the air is cooled to any desired degree by the process of evaporation. In accomplishing this, water or other liquid contained in wicking material surrounding the heat exchange tubes evaporates into other air thus cooling the air within the tubes.

As previously explained, the cooling air for section C, and the air passed through section D may be controlled in a great variety of ways. The flexibility of control of this air also provides a convenient means of controlling the dryness and temperature of the conditioned air within certain limits.

A modified form of vapor and heat exchanger is illustrated in Figures 9 and 10. In this construction a plurality of porous tubes 57 containing hygroscopic material 58 are supported in rows in casing 59. Strips 60 of thin metal of high heat conductivity are closely wrapped about a portion of the circumference of tubes 57 and held in position by rods 61. As shown in Figure 9, the strips of adjacent rows of tubes face each other so as to form a metallic, walled fluid passage 62, and a porous tube walled air passage 63. Conduits 64 are provided to conduct cooling air to and from passages 62, and other conduits, not shown, are provided for conveying air to be conditioned through passages 63. The manner in which this device operates is at once apparent in view of the detailed description of the other exchangers. Obviously, the vapor and heat exchanger of Figures 9 and 10 may be substituted for any one of the exchangers A, B, and C.

It is also to be understood that, besides the absorbent materials already referred to, the apparatus described in the foregoing lends itself to the use of many cheap, plentiful and efficient absorbents such as silicious clay, salts, certain types of turf, peat, absorption coals and other absorption materials not heretofore usable for lack of knowledge of practical apparatus for utilizing the same.

Although the foregoing description describes the apparatus as used to condition air, it will, of course, be understood that the invention is useful in separating a mixture of many different gases where the conditions are such that one or more gases are absorbable by an absorbent and one or more gases of the mixture are not absorbable thereby. The absorbent material employed would be dependent on the particular conditions and the particular gases to be separated, all of which should be clear from the state of the prior art as amplified by this disclosure.

From the above description it will be obvious that the invention can be carried out in a number of ways. Various other changes, not illustrated, will be apparent to those skilled in the art without departing from the spirit of the invention or scope of the annexed claims.

I claim:

1. Air conditioning apparatus comprising a housing supporting a plurality of drying elements including a porous sheet, a non-porous sheet spaced therefrom, said space being filled by loose hygroscopic material, and a plurality of cooling elements, said cooling elements including at least a sheet of material of high heat conductivity separating the air to be cooled from a cooling medium, said drying and cooling elements being so arranged that the air to be conditioned is passed into contact with said porous sheets whereby water vapor is absorbed by the hygroscopic material, and then the air is passed over said sheet of high heat conductivity whereby the temperature of the air is reduced.

2. Air conditioning apparatus for alternately drying and cooling air in stages comprising a housing supporting members having a large drying capacity, then cooling members of small drying capacity, then members of large drying capacity, and finally members of large cooling capacity whereby the air is alternately dried and cooled to a desired relative humidity and temperature.

3. The method of conditioning air in stages which comprises removing moisture from atmospheric air by the process of absorption, removing the endothermic heat of absorption from the air by passing the same in heat exchange relation to a cooling medium, removing additional moisture by exposing the cooled air to other absorbent material, and then cooling the dried air to a desired temperature by passing said dried air in heat exchange relation but out of contact with an evaporating liquid.

4. The method of conditioning air in stages which comprises exposing atmospheric air to an absorbent material, removing the endothermic heat of absorption from the partially dried air, exposing the air so cooled to other absorbent material, cooling the dried air by an evaporative process, and employing part of the cooled, dry air to cool at least one of said bodies of absorbent material.

5. The method of conditioning air in stages which comprises exposing atmospheric air to an absorbent material while passing a cooling medium in heat exchange relation to said material, passing other cooling medium in heat exchange relation to said partially dried air, further drying the cooled air by exposing the same to other absorbent material, cooling the dried air to a desired temperature by passing it in heat exchange relation to evaporating water, employing part of said cooled, dry air to cool at least one of said bodies of absorbent material.

6. The method of conditioning air in stages which comprises exposing atmospheric air to an absorbent material while passing a cooling medium in heat exchange relation to said material, passing other cooling medium in heat exchange relation to said partially dried air, further drying the cooled air by exposing the same to other absorbent material, cooling the dried air to a desired temperature by passing it in heat exchange relation to evaporating water, employing part of said cooled, dry air to cool at least one of said bodies of absorbent material, and then passing said part of the air into the presence of said evaporating water to increase the rate of evaporation and the cooling of the dried air.

7. In apparatus for conditioning air, means for exposing air to be dried to loose absorbent material, means for passing air in contact with one side of a heat exchange device, means for evaporating water adjacent the other side of the heat exchange device to cool the air passing in contact with said one side, and means for conducting part of the cooled, dry air into heat exchange relation with said absorbent material to remove the endothermic heat of absorption.

8. In apparatus for conditioning air, means for exposing air to be dried to loose absorbent material, means for passing air in contact with one side of a heat exchange device, means for evaporating water adjacent the other side of the heat exchange device to cool the air passing in contact with said one side, and adjustable means for conducting any desired proportion of said cooled, dry air and atmospheric air over at least one of said bodies of absorbent material to cool the same and into the presence of said evaporating water to control the rate of evaporation of the water.

9. The method of controlling the cooling of dried air comprising passing the dried air into heat exchange relation with evaporating water, and passing any desired portion of the cooled, dry air and atmospheric air into the presence of the evaporating liquid to control the rate of evaporation.

EDMUND ALTENKIRCH.